United States Patent
Schuessler

(10) Patent No.: US 6,941,223 B2
(45) Date of Patent: Sep. 6, 2005

(54) METHOD AND SYSTEM FOR DYNAMIC DESTINATION ROUTING

(75) Inventor: Robert Schuessler, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 56 days.

(21) Appl. No.: 10/339,663

(22) Filed: Jan. 10, 2003

(65) Prior Publication Data

US 2003/0135325 A1 Jul. 17, 2003

(30) Foreign Application Priority Data

Jan. 10, 2002 (DE) ........................................ 102 00 759

(51) Int. Cl.[7] .............................. G08B 1/09; G08F 165/00
(52) U.S. Cl. ...................... 701/210; 701/200; 701/201; 701/204; 701/208; 701/209; 701/210; 340/988; 340/995.13; 340/995.21
(58) Field of Search ................................. 701/200, 201, 701/204, 205, 206, 207, 208, 209, 210, 213, 217, 218; 340/988, 989, 990, 995.13, 995.21

(56) References Cited

U.S. PATENT DOCUMENTS

| | | | |
|---|---|---|---|
| 4,733,356 A | 3/1988 | Haeussermann et al. | 701/25 |
| 5,291,413 A | * 3/1994 | Tamai et al. | 701/210 |
| 5,371,678 A | 12/1994 | Nomura | 701/210 |
| 5,933,100 A | 8/1999 | Golding | 340/995.13 |
| 6,163,751 A | 12/2000 | Roekel | 701/210 |
| 6,278,942 B1 | 8/2001 | McDonough | 701/210 |
| 6,615,130 B2 * | 9/2003 | Myr | 701/117 |

FOREIGN PATENT DOCUMENTS

| | | |
|---|---|---|
| DE | 198 28 077 A1 | 6/1998 |
| DE | 199 12 742 A1 | 3/1999 |
| DE | 199 41 966 A1 | 9/1999 |
| DE | 199 53 671 A1 | 11/1999 |
| DE | 199 56 108 A1 | 11/1999 |
| EP | 0715289 | 6/1996 |
| EP | 0 838 797 A1 | 4/1998 |
| FR | 2721738 | 12/1995 |
| WO | 98/26253 | 6/1998 |
| WO | WO 00/74019 | 12/2000 |
| WO | 01/75838 | 10/2001 |

* cited by examiner

Primary Examiner—Thomas G. Black
Assistant Examiner—Arthur D. Donnelly
(74) Attorney, Agent, or Firm—Crowell & Moring LLP

(57) ABSTRACT

In a system for the destination routing of a vehicle, a route is determined which is optimal based on input vehicle position and destination information and on stored information, and taking into account additional information; and destination routing information is issued with respect to the optimal route. The additional information is received by an external transmitting unit and/or is stored in a memory on board the vehicle. A check takes place during the drive as to whether the route recommendation remains optimal, and a further optimal route determination is triggered if it does not.

21 Claims, 3 Drawing Sheets

METHOD AND SYSTEM FOR DYNAMIC DESTINATION ROUTING

BACKGROUND AND SUMMARY OF THE INVENTION

This application claims the priority of German patent application 102 00 759.4, filed 10 Jan. 2002, the disclosure of which is expressly incorporated by reference herein.

The invention relates to a system for the dynamic destination routing of vehicles.

European Patent Document EP 0 838 797 A1 discloses a destination routing system for a vehicle, in which a first (static) route is computed without considering traffic information. The destination routing is then started for the first route and, during the drive, received traffic information is analyzed with respect to its relevance to the first route. If relevant traffic information occurs for the first route, a second (dynamic) route is computed, considering traffic information. The second route is offered for selection to the driver as an alternative route, if the computed driving time is shorter on the alternative route than on the first route. Selection of the alternative route is performed by driving the alternative route.

German Patent Document DE 199 56 108 A1 discloses a method for dynamic destination routing of a motor vehicle, in which, when traffic hindrances occur on an originally computed route, alternative routes are computed for several turn-off points, bypassing the traffic hindrance. The alternative routes are offered to the driver for his selection. The driver may choose an alternative route by using his operating unit, by driving the alternative route, in which case the system automatically recognizes which of the suggested routes is driven by the driver. The driver then receives destination routing information with respect to the recognized alternative route.

One object of the invention is to increase the driver's acceptance of a system for the dynamic destination routing of vehicles, of the initially mentioned type.

This and other objects and advantages are achieved by the system according to the invention, which analyzes additional information, particularly traffic information, of several information sources and matches this information. These information sources comprise RDS (Radio Data System), RDS/TMC (Radio Data System/Traffic Message Channel), control-center-supported services, internet-based and/or WAP-based (Wireless Application Protocol) services. In this manner, a destination routing can be carried out dynamically on the basis of data from multiple sources, which increases the currency and the reliability of the method. As a result of the match, it can also be ensured that all additional information supplied to the driver is in itself without contradiction.

During the drive, the destination routing system constantly performs a type of self-diagnosis in order to determine whether the issued recommendations make sense (that is, whether they remain optimal) in view of actual conditions. To increase the acceptance by the driver, it is advantageous to supply explanatory information to the driver on the basis of the check of whether the routing makes sense.

For checking whether the routing makes sense, it is compared, for example, whether the actual parameters correspond to the parameters determined when defining the optimal route or used as a basis for the optimal route. In an advantageous embodiment of the invention, a constant comparison is made during the drive of whether the actual driving progress (that is, in the form of the actually covered path and/or the time which has passed since the start of the drive) corresponds to the driving progress computed when determining the optimal route. This constant comparison is advantageous for ensuring that the information offered to the driver by the destination routing system is free of contradictions with respect to his or her direct on-site perception. This is especially relevant when using predicted additional information, particularly traffic predictions. When the prognosticated traffic event does not occur, this can be determined by the comparison between the actual driving progress and the purported driving progress.

When the actual parameters deviate from the determined parameters of the optimal route, further measures can be taken to increase the quality of the destination routing and/or to increase the acceptance by the driver. Thus, other, more detailed additional information can be requested which may help to clarify the deviation or the taking of new measures. This might include, for example, information which explains the deviation and informs the driver that a search is taking place for an alternative route.

For the purpose of judging whether the route recommendation makes sense, it is also advantageous to take into account the fact that different information sources may exist for the additional information. The sources for additional information, which are simultaneously available, may differ with respect to the quality of the information (for example, the correctness, currency or quantity of the information, including the completeness and/or the depth of details). The method takes these differences into account during the analysis and the matching.

It is also advantageous to supply the driver with explanatory information concerning, for example, the source of the additional information that is taken into account in the destination routing, with an assessment of its qualitative and/or quantitative characteristics. Such information enables the driver to understand the situation and the information on which the destination routing information is based. In the event of apparent mistakes of the destination routing, this increases the acceptance by the driver.

In an advantageous further development of the invention, to determine whether the route recommendation makes sense, it is checked during the drive whether relevant additional information is available and/or is arriving for the residual route to be driven, including externally received additional information and/or information present in a memory carried along in the vehicle. The details of the additional information are constantly verified. Thus, during the drive, new additional information may actively be requested. For example, when a local traffic jam is approached during the drive, new additional information will be actively requested, specifically detailed and updated additional information concerning the traffic jam located ahead of the vehicle, so that a precise response can be made based on the existing updated and detailed additional information.

If new aspects occur during the drive (for example, the real parameters deviate from the determined parameters of the optimal route and/or that the additional information concerning the route situated in front of the vehicle changes) a dynamic computation of the residual route is triggered (that is, the route from the current location of the vehicle to the destination).

Further, the acceptance by the driver can be increased if when caught in a traffic jam, for example, he or she receives an explanation as to why no alternative route was selected. As a result, it is possible for the driver to eliminate contradictions between the actions of the destination routing and his own additional information, such as obtained from his direct perception of the local traffic situation.

The destination routing system comprises two system parts. The first system part is fixedly installed in the vehicle and comprises a computer, a memory, particularly for storing a digital map, an input unit and an output unit. The second system part is constructed to be portable and comprises a memory, particularly for storing additional information; a computer; a receiving unit, particularly for receiving additional information; and a computer. The second system part may be constructed as a PDA, as a PDA-type unit, as a laptop, as a portable mobile phone. It may also be constructed as a unit so that one or more units are integrated in a housing or several units can be fitted together.

The static destination routing, which is based on data stored in a digital card, is implemented on the system part fixedly installed in the vehicle. The static destination routing takes into account no dynamic additional information. The dynamic destination routing is carried out on the portable system part, where the dynamic additional information is taken into account.

This arrangement permits a novel division of functions between static process steps, which take place on system parts fixedly installed in the vehicle, and dynamic process steps which take place on portable system parts which can be connected with the vehicle. These system parts, which can be connected with the vehicle, can be easily exchanged. They can also be pre-recorded with new software versions; and can therefore easily be changed even after the delivery of the vehicle. This is advantageous for implementation of processes and options for dynamic determination of the destination routing, which are subjected to constant changes, particularly with respect to the offered traffic data and their utilization. The functional division of the system into parts installed in the vehicle and portable parts simplifies the further development of dynamic functionalities and facilitates lower expenditures.

Other objects, advantages and novel features of the present invention will become apparent from the following detailed description of the invention when considered in conjunction with the accompanying drawings.

DETAILED DESCRIPTION OF THE DRAWINGS

Figure 1:
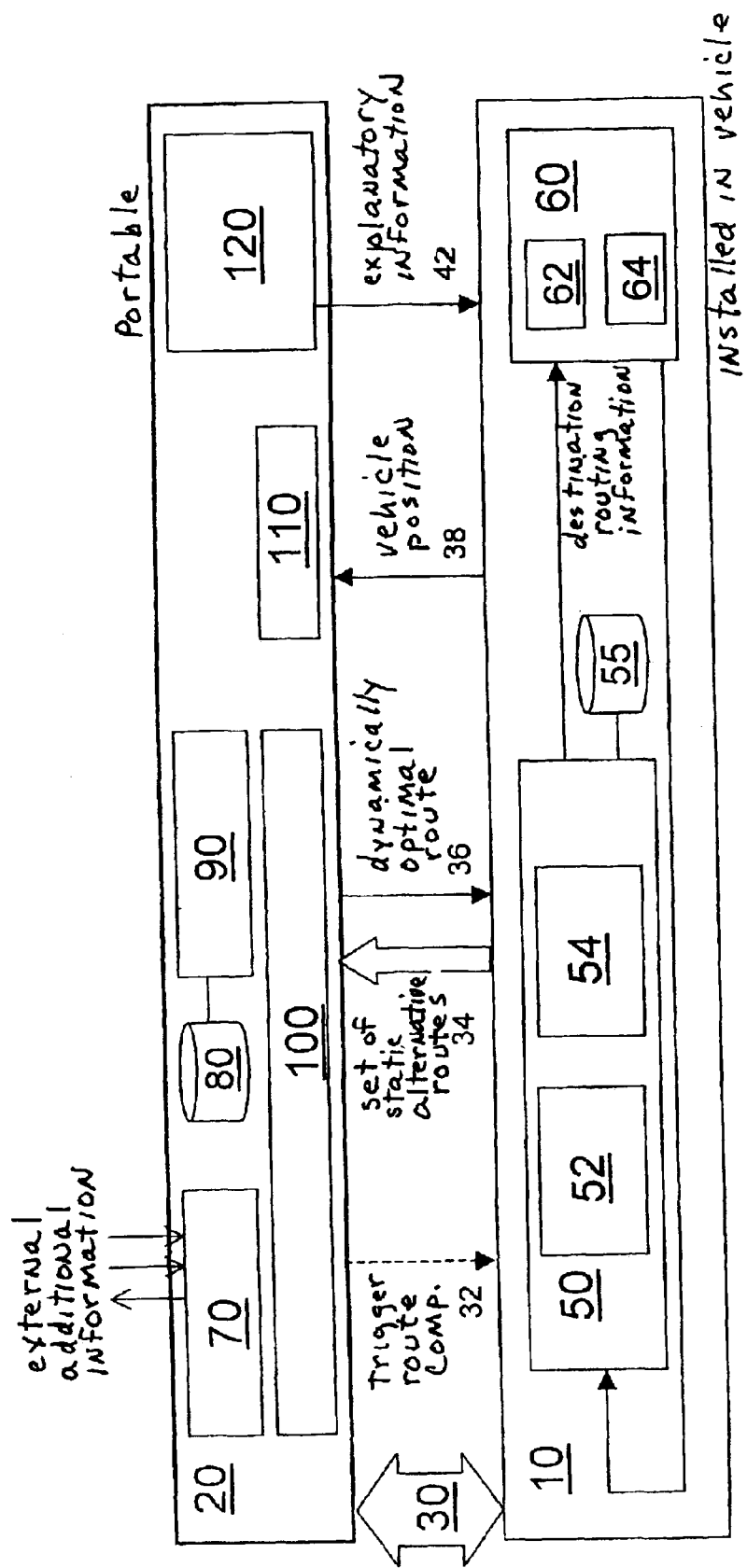
FIG. 1 is a schematic block diagram of a vehicle destination routing system according to the invention.

FIG. 1 is a schematic representation of a vehicle destination routing system with a first system part 10 fixedly installed in the vehicle and a portable second system part 20 with a wireless or wire-bound data connection 30. The driver or user can establish the data connection, for example, by plugging the portable system part 20 into a receiving device. The receiving device then establishes the data-related connection with the first system part 10, whether it is wire-bound or wireless. The wireless data connection can be implemented, for example, by way of infrared and/or radio, such as Bluetooth. For this purpose, the corresponding interface, such as Bluetooth, may also be integrated directly in the portable system part.

As illustrated in FIG. 1, the first system part 10 may be accommodated in a housing. However, it is also possible to accommodate the modules 50, 52, 54, 55, 60, 62, 64 of the system part 10 in various housings and connect them, for example, by means of a data bus system.

Data which are exchanged by way of the data connection 30 between the system part 10 fixedly installed in the vehicle and the portable system part 20 may comprise, for example, the information indicated in FIG. 1, such as the trigger for a new route computation 32, the set of "static" alternative routes 34, the "dynamically" optimal route 36, the vehicle position 38 and/or the explanatory information for the driver 42.

The system part 10 fixedly installed in the vehicle comprises the navigation module 50, the memory 55, particularly for a digital map, and the display and operating unit 60. The navigation module 50 comprises the route computation 52 and generates the destination routing information 54. The figure does not separately show the unit which determines the vehicle position 38, for example, by means of satellite locating, such as the GPS. As an alternative or in addition, vehicle sensor data, such as rotating rate sensor data, rotational wheel speed sensor data, can be analyzed. Additional locating possibilities consist of the analysis of mobile radio communication cells and/or radio locating and/or beacons. The unit for determining the position is advantageously situated in the system part 10 because vehicle sensors can easily be analyzed in the vehicle. However, it is also possible to perform the position determination in the system part 20, which is advantageous, for example, for the mobile radio communication cell analysis or when the system part 20 contains the GPS.

The display and operating unit 60 comprises an output unit 62 and an input unit 64. The output unit 62 may be constructed as an optical and/or acoustic output unit, and is used, for example, to output destination routing information. The input unit 64 is used, for example, for input of the destination. As an alternative, the system offers the possibility of automatically recognizing a destination when the driver moves along a route which is frequently driven by him.

The portable system part 20 comprises a memory 80, particularly for stored "off-line" traffic data/information, with an associated analyzing unit 90, a transmitting/receiving device with an analyzing unit 70 for additional information available "on-line", which is received either by way of a broadcasting channel or is received and/or requested by way of a bi-directional channel and is then received. The portable system part 20 also includes a unit 100 for determining the optimal route from the set of static alternative routes 34. The unit 110 monitors real parameters and compares them with parameters assumed when determining the optimal route. For determining the real driving progress, the unit 110 receives the vehicle position 38 from the system part 10 by way of the data connection 30. A digital map may also be stored in the memory 80, which map is sufficiently detailed to permit the unit 110 to image the driving progress and the additional information on the digital map. The unit 120 generates explanatory information 42, which is transmitted to the system part 10 via the connection 30 and emitted by the output unit 62.

Figure 2:
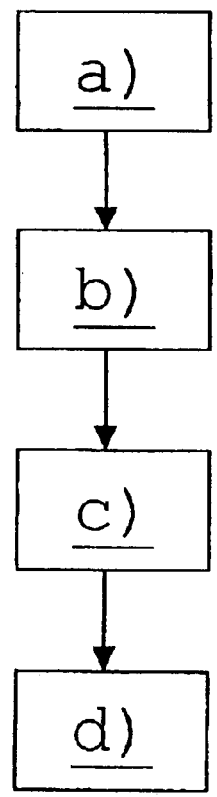
FIG. 2 is a flow chart of a destination routing process according to the invention.

FIG. 2 illustrates the destination routing method as an example. The destination routing operation is started for example, when the driver or user inputs a destination into the input unit 64, and/or when the navigation module 50 recognizes a route frequently used by the driver as well as its destination. A position determination device (not shown) determines the actual position of the vehicle. Then, in Step a), which is advantageously implemented in the system part 10 on the navigation module 50 (in particular, the route computation unit 52), a set of routes 34 is computed between the actual position, the starting point and the destination point, taking into account the digital map stored in the memory 55. The memory 55 is constructed, for example, as a mass memory in the form of a CD or DVD.

The set of routes 34 computed in the route computation unit 52 is forwarded to the system part 20 via the data connection 30. In Step b), relevant additional information for the set 34 of routes is determined in units 70 and 90. The route 36 which is optimal with respect to an applicable criterion and the additional information is determined in Step c) in unit 100 of the system part 20, based on the additional information relevant for the set 34 of routes determined in units 70 and 90. The time required to drive the route is advantageously selected as the applicable criterion. However, other criteria, such as the lowest toll, are also possible.

The dynamically optimal route 38 is then forwarded by way of the data connection 30 to the system part 10, where destination routing information is generated in the module 54 with respect to the route 38 and is forwarded to the module 62 for the output. The output of the destination routing information then takes place in Step d) of the process.

Figure 3:
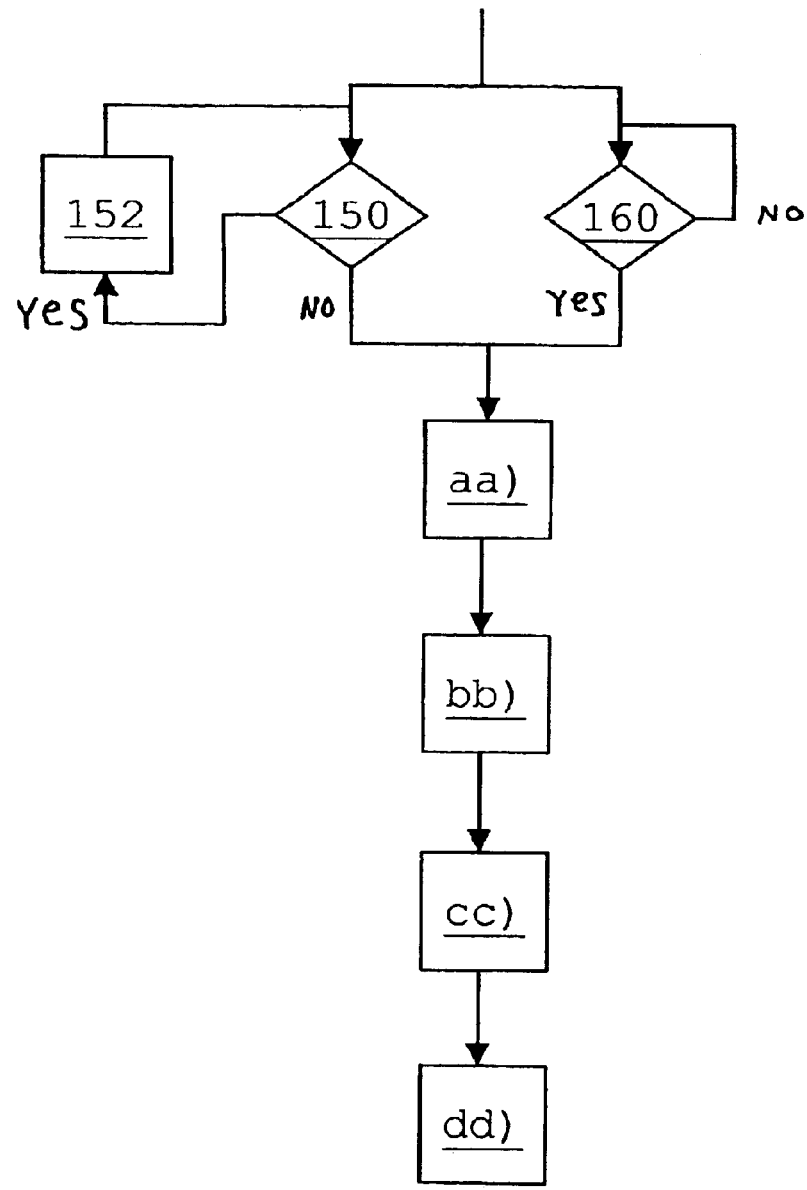
FIG. 3 is a flow chart of a destination routing process for a residual route.

FIG. 3 is a flow chart that illustrates an example of the determination of a dynamically optimal residual route during the drive. In Step 150 an inquiry is made whether the actual driving progress corresponds to the driving progress used as the basis when computing the optimal route in Step c). If not, ("no" branch), the route computation 32 trigger is set. In addition, it is advantageous in this situation to optionally, in Step 152, supply explanatory information 42 to the driver, explaining that contrary to expectations, the drive will take place in a manner that is different than planned, and that the system is working on the problem. This increases the acceptance of the system, because the driver will not feel abandoned in the event of a contradiction between reality and assumptions of the system.

During the drive, it is determined in Step 160 whether new additional information is present, for example having been received spontaneously or queried concretely from the system part 20. It is advantageous to initiate the query, for example, when the vehicle approaches a predicted traffic jam in order to thus query in a targeted manner detailed and locally limited additional information. It also makes sense to initiate a query when it is determined in Step 150 that real parameters do not correspond to assumed parameters, in order to determine the cause of the discrepancy by way of requested detailed information and, if required, to be able to supply the driver with explanatory information 42.

If real parameters and assumed parameters do not correspond to one another ("no" branch in Step 150), or if new additional information is present ("yes" branch in Step 160), the trigger 32 is set again, and the computation of a set of residual routes by the module 52 is triggered in step aa). The set of residual routes includes those (multiple) routes which lead from the current location of the vehicle to the destination location. Then, analogous to the set 34 of routes, the module 52 forwards the set of residual routes to the system part 20, where the relevant additional information for this set of residual routes is determined in Step bb). The optimal residual route is then determined (Step cc)) in module 100 taking into account the dynamic relevant additional information, analogous to the optimal route 36.

At this point, the optimal residual route can be forwarded to the system part 10. A check will then take place in the system part 10 as to whether the optimal residual route corresponds to the previous planned route. However, the latter determination may also be made in system part 20, in which case, a new route is forwarded to the system part 10 only if the determined dynamic optimal residual route differs from the optimal route 36.

If the optimal residual route corresponds to the previous planned route, destination routing instructions concerning the previous route continue to be emitted. In this case, Step dd) corresponds to the continuation of the output of destination routing instructions of Step d). In such a case, it is advantageous also to supply explanatory contradiction-free information to the driver, in order to increase the acceptance when he is nevertheless in a traffic jam on the recommended route which was determined to be optimal. An example of such an explanatory information could be an indication that alternative routes had been checked but would demand even more driving time.

If the optimal residual route does not correspond to the previous planned route, destination routing instructions with respect to the optimal residual route are supplied in Step dd).

It is another advantage of the destination routing system that it can also be operated completely without the portable system part, using the basic function of a static destination routing. When the portable part has been forgotten or lost, destination routing can at least take place without any dynamic additional information. It is also advantageous that the interactions of the system parts 10 and 20 take place unnoticed by the driver in the background, and permit a continuous adaptation of the destination routing to changing traffic situations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for the destination routing of a vehicle, in which a route recommendation is determined that is optimal based on input vehicle position and destination information and stored information, and taking into account additional information; and destination routing information is issued with respect to the optimal route, the additional information being received by an external transmitting unit or being stored in a memory on board the vehicle, wherein:

during the drive a check is made whether the route recommendation remains optimal, based on a comparison of whether real travel parameters of the vehicle correspond to the parameters used when determining the optimal route;

a determination that the route recommendation does not remain optimal triggers a new optimal route determination; and the travel parameters include at least one of travel time and traveled distance.

2. The system according to claim 1, wherein a new optimal route determination is also triggered by a receipt of new additional information.

3. The system according to claim 1, wherein the route with the shortest traveling time is determined to be optimal.

4. The system according to claim 1, wherein the additional information comprises traffic information.

5. The system according to claim 2, wherein the additional information comprises traffic information.

6. The system according to claim 3, wherein the additional information comprises traffic information.

7. The system according to claim 1, wherein the additional information is obtained from several different sources.

8. The system according to claim 1, wherein the check of whether the route recommendation remains optimal comprises an evaluation of at least one of quality and quantity of the additional information.

9. The system according to claim 1, wherein the check of whether the route recommendation remains optimal takes into account that, during the drive, additional information relevant to a residual route to be driven is determined from additional information that is received from an external transmitting unit or is stored in a vehicle-internal memory.

10. The system according to claim 1, wherein, as a result of checking whether the route recommendation remains optimal, a determination of a residual route is triggered, taking into account relevant additional information.

11. The system according to claim 1, wherein, for increasing the acceptance of recommendation information by the driver, explanatory information is issued to the driver.

12. The system according to claim 1, wherein:
the system comprises a system part fixedly installed in the vehicle and a portable system part; and
the system part fixedly installed in the vehicle is connected with the portable system part via at least one communication interface.

13. The system according to claim 12, wherein a static destination routing is carried out on the system part fixedly installed in the vehicle, and a dynamic destination routing is carried out on the portable system part.

14. The system according to claim 12, wherein the portable system part comprises a mobile communication device.

15. A system for the destination routing of a vehicle, comprising:
a first part fixedly installed in the vehicle, the first part determining an optimal route; and
a second portable part coupled to the first part, the second part receiving the optimal route from the first part and determining a new optimal route; wherein,
the second part determines a new optimal route based on a comparison of real travel parameters of the vehicle and travel parameters associated with the determined optimal route; and
the travel parameters include at least one of travel time and traveled distance.

16. The system of claim 15, wherein the second portable part determines a new optimal route while the second part is located within the vehicle.

17. The system of claim 15, wherein the second part determines the new optimal route based on additional information, and the first part comprises an output which outputs a source of the additional information.

18. The system of claim 15, wherein the first part is coupled to the second part using a wireless Bluetooth connection.

19. A method for destination routing of a vehicle, the method comprising the acts of:
determining, based on static information, an optimal route;
receiving additional information;
determining, based on a comparison of real travel parameters of the vehicle with travel parameters associated with the optimal route, whether the optimal route remains optimal; and
determining a new optimal route when the optimal route does not remain optimal, wherein the new optimal route is determined using the additional information,
wherein the travel parameters include at least one of travel time and traveled distance.

20. The method of claim 19, wherein the determination of the optimal route and the new optimal route are performed within the vehicle.

21. The method of claim 19, further comprising the act of:
outputting a source of the additional information, wherein the source of the additional information includes at least one of Radio Data System (RDS), RDS/Traffic Message Channel (RDS/TMC), control-center-supported services, internet-based and Wireless Application Protocol-based (WAP) services.

* * * * *